UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

AZO DYE AND PROCESS OF MAKING SAME.

No. 914,146.     Specification of Letters Patent.     Patented March 2, 1909.

Application filed November 9, 1908. Serial No. 461,779.

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, Germany, have invented new and useful Improvements in Azo Dyes and Processes of Making Same, of which the following is a specification.

We have discovered that by combining diazotized 3-chlor-6-nitranilin-4-sulfonic acid with 2-naphthol, or with 2-naphthol-6-monosulfonic acid, or with 2-naphthol-3.6-disulfonic acid, coloring matters can be obtained which are specially suitable for use in the form of their lakes, being insoluble in oil and possessing a good covering power and being fast against the action of alcohol, lime, and heat. They are also particularly fast against the action of light. The lakes are of a brilliant orange color, those obtainable when using the hereinbefore mentioned monosulfonic acid being somewhat yellower than those obtained from the other components. When subjected to the action of tin and hydrochloric acid, they yield 5-chlor-1.2-diamino-benzene-4-sulfonic acid and an ortho-aminonaphthol compound.

The following examples will serve to illustrate further the nature of our invention and how it can be carried into practical effect, but our invention is not confined to these examples. The parts are by weight.

Example 1: Diazotize, in the usual manner, twenty-seven and one-half parts of the sodium salt of 3-chlor-6-nitranilin-4-sulfonic acid, filter off the difficulty soluble diazo compound and stir it with water, and then introduce it into a suspension of fifteen parts of beta-naphthol in three hundred parts of water, stir the mixture for about half an hour and then warm it to fifty degrees centigrade and add one hundred parts of concentrated common salt solution, and filter off the coloring matter and press and dry it. It is soluble in water, the solution being orange-yellow. Upon the addition of barium chlorid to this solution the barium salt of the coloring matter is completely precipitated and is yellowish red.

Example 2: Diazotize, in the usual manner, twenty-seven and one-half parts of the sodium salt of 3-chlor-6-nitranilin-4-sulfonic acid and introduce the diazo compound, while stirring well, into a solution of twenty-four and three-fifths parts of the sodium salt of 2-naphthol-6-monosulfonic acid in five hundred parts of water, to which has been added the amount of sodium carbonate necessary to maintain the whole alkaline. After a short time the combination is complete. If necessary, complete the precipitation of the coloring matter by means of common salt solution and filter off the coloring matter and dry it.

Now what we claim is:

1. The process of producing azo coloring matter by combining diazotized 3-chlor-6-nitranilin-4-sulfonic acid with a hereinbefore defined 2-naphthol compound.

2. The process of producing azo coloring matter by combining diazotized 3-chlor-6-nitranilin-4-sulfonic acid with beta-naphthol.

3. As new articles of manufacture the azo coloring matters obtainable by combining diazotized 3-chlor-6-nitranilin-4-sulfonic acid with a hereinbefore defined 2-naphthol compound which coloring matters in the form of their lakes possess an orange color and are fast against the action of alcohol, lime, heat, and light and upon reduction with tin and hydrochloric acid yield 5-chlor-1:2-diamino-benzene-4-sulfonic acid and an ortho-aminonaphthol compound.

4. As a new article of manufacture the azo coloring matter obtainable by combining diazotized 3-chlor-6-nitranilin-4-sulfonic acid with 2-naphthol which coloring matter in the form of its barium lake possesses an orange color and is fast against the action of alcohol, lime, heat and light and upon reduction with tin and hydrochloric acid yields 5-chlor-1: 2-diamino-benzene-4-sulfonic acid and 1-amino-2-naphthol.

In testimony whereof we have hereunto set our hands in the presence of two subscribing witnesses.

PAUL JULIUS.
ERNST FUSSENEGGER.

Witnesses:
ERNEST T. EHRHARDT,
JOS. H. LEUTE.